Sept. 30, 1952  D. L. McFARLAND  2,612,591
ELECTRIC HEATER
Filed May 29, 1951

Inventor:
Donald L. McFarland,
by *Sheridan......*
His Attorney.

Patented Sept. 30, 1952

2,612,591

UNITED STATES PATENT OFFICE 2,612,591

ELECTRIC HEATER

Donald L. McFarland, Stratford, Conn., assignor to General Electric Company, a corporation of New York Application May 29, 1951, Serial No. 228,875

4 Claims. (Cl. 219—39)

1

The present invention relates to electric heaters used for heating or for heating and effecting circulation of air and useful primarily for heating air in a room or other enclosure.

An object of my invention is to provide an improved electric heater which is efficient in effecting and directing heat from a heating unit and, preferably, also for effecting and directing circulation of heated air over a large area. A further object is to provide a heater which is simple in structure and capable of being constructed so it is light in weight, whereby it may be used to advantage as a portable electric room heater.

In carrying out my invention, there are provided opposed curve annular reflector surfaces having a common vertical axis with an electric heating unit positioned between them and on such axis, the reflector surfaces being generated by rotating a parabola about said common vertical axis with its focal point on the periphery of said heating unit.

For a consideration of what I believe to be novel and my invention, attention is directed to the following specification and to the claims appended thereto.

Figure 1:
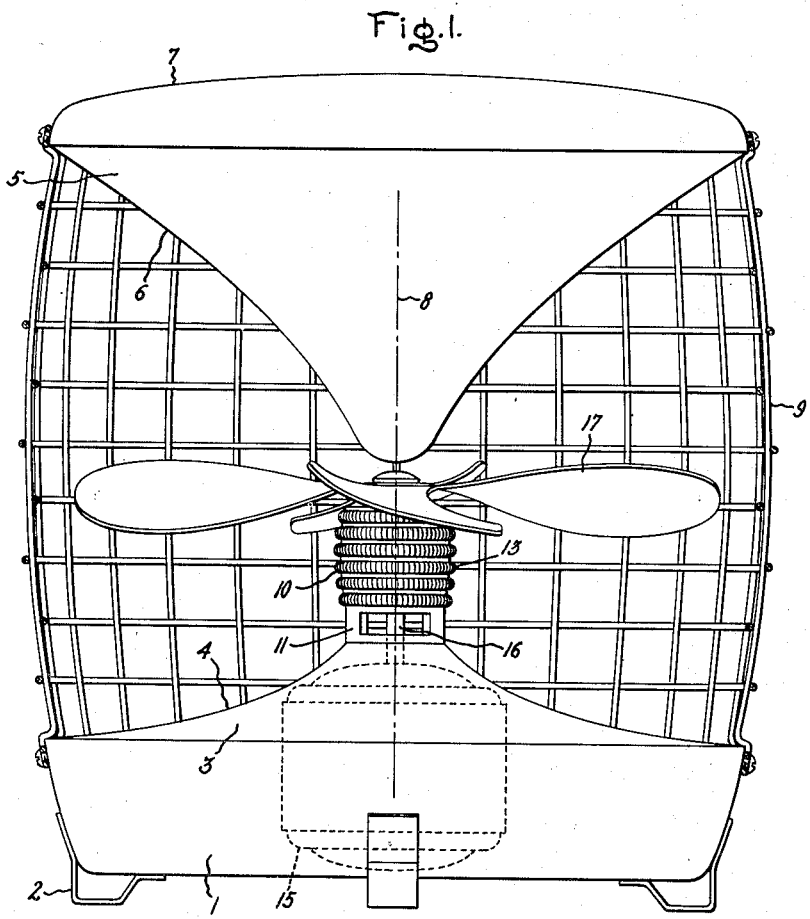
Figure 2:
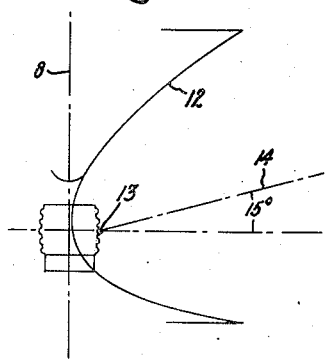

In the drawing, Fig. 1 is a side elevation of an electric heater embodying my invention; and Fig. 2 is a diagrammatic view illustrating the manner in which the surfaces of the reflectors which form a part of the heater are generated.

Referring to the drawing, 1 indicated a base having suitably spaced supporting feet 2. The base and feet may be formed of any suitable material, such as relatively thin sheet metal. The base is circular in transverse cross section and its top wall is in the form of what may be termed a parabolic cone 3, the surface of the cone being curved as hereinafter described. The side wall of parabolic curve 3 defines an upwardly facing annular deflector 4. Vertically spaced with respect to reflector 4 is a parabolic cone 5, the side wall of which defines a downwardly facing annular reflector 6. Cone 5 may be formed from any suitable material, such as relatively thin sheet metal and may have an enclosing base 7 which in substance forms the top wall of the heater. Cones 3 and 5 have a common vertical axis indicated at 8. Cone 5 is supported on base 1 in vertical spaced relation with respect thereto by suitable supporting means such as the grill work 9 which functions also as a guard. There are thus provided two opposed vertically spaced reflectors 4 and 6 having a common vertical axis 8.

2

Positioned between the two reflectors and surrounding the common axis 8 is an annular electric heating unit 10 of suitable size to provide the desired amount of heat. The heating unit is supported on base 1 by a suitable holder 11 which may be formed from suitable insulating material and which positions the heater midway between the two cones.

A feature of my invention resides in the relation of the surfaces of the two reflectors relatively to each other and to the heating unit 10. The surfaces are generated by a parabola as indicated at 12 (Fig. 2) which is rotated about the vertical axis 8 with its focal point 13 on the outer surface of the heating unit and preferably midway between the two ends of the heating unit. Preferably also in generating the surface, the parabolic axis indicated at 14 is tilted upward from the horizontal. The amount by which it is tilted depends upon the heat distribution desired, it being clear that the more the axis is tilted, the more the heat will be directed upwardly. I have found an angle of 15° to give satisfactory results and this is the angle indicated in the drawing. However, it is to be understood that my invention is not limited to an angle of this order.

I may with advantage provide a fan for effecting circulation of air over the heating unit, the air being guided and directed by the reflectors 4 and 6. To this end, an electric motor 15 is supported in base 1 in any suitable manner, the shaft 16 of the motor being vertical and having on its upper end a fan comprising suitable fan blades 17. I may provide a multi-speed motor so the fan can be operated at higher and lower speeds. Ordinarily, the heater will be "on" only at lower fan speeds, it being "off" at higher speeds. Preferably, the fan is located above the top of the heating unit. The fan blades are shaped to take in air on their lower sides and discharge it upwardly and outwardly against the reflector 6. With this arrangement, the air flows to the fan along the surface of reflector 4 and is directed by the reflector into proximity to the heater unit and the reflected heat and thence it passes through the fan and is then directed outwardly and upwardly by the surface of reflector 6. Thus, when a fan is utilized, the surfaces of reflectors 4 and 6 function as heat reflectors and as deflectors or guiding surfaces for the moving air. The electrical wiring circuits for the heating unit and for the electric motor and the switches for controlling the circuits are not shown since suitable arrangements are well known and form no part of my present invention. In using the heater, the heating unit and fan may be used either separately or simultaneously as found desirable.

By tilting the axis of the parabola which generates the surfaces of reflectors 4 and 6 upward at a suitable angle from the horizontal, it will be seen that when the heater is placed on a floor, the heat from it will be directed at an angle upwardly from the floor. This serves to place the heat where it is needed.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

What I claim as new and desire to secure by Letters Patent of the United States is:

1. An electric heater comprising a base, a lower upwardly facing annular convex reflector carried by the base, an upper downwardly facing annular convex reflector supported on the base in spaced relation to the lower reflector, said reflectors having a common vertical axis, and an electric heating unit positioned between said reflectors along the line of said common vertical axis, said reflecting surfaces being generated by rotating a parabola about said common vertical axis with its focal point on the periphery of said heating unit.

2. An electric heater comprising a base, a lower upwardly facing annular convex reflector carried by the base, an upper downwardly facing annular convex reflector supported on the base in spaced relation to the lower reflector, said reflectors having a common vertical axis, and an electric heating unit positioned between said reflectors along the line of said common vertical axis, said reflecting surfaces being generated by rotating a parabola about said common vertical axis with its focal point on the periphery of said heating unit and its axis tilted upwardly at an angle to the horizontal.

3. An electric heater comprising a base, a lower upwardly facing annular convex reflector carried by the base, an upper downwardly facing annular convex reflector supported on the base in spaced relation to the lower reflector, said reflectors having a common vertical axis, an electric heating unit positioned between said reflectors along the line of said common vertical axis, said reflecting surfaces being generated by rotating a parabola about said common vertical axis with its focal point on the periphery of said heating unit, an electric motor supported on the base, and fan blade means driven by the motor for effecting circulation of air inwardly along the surface of the lower reflector, over the heater unit and outwardly along the surface of the upper reflector.

4. An electric heater comprising a base, a lower upwardly facing annular convex reflector carried by the base, an upper downwardly facing annular convex reflector supported on the base in spaced relation to the lower reflector, said reflectors having a common vertical axis, an electrical heating unit positioned between said reflectors along the line of said common vertical axis, said reflecting surfaces being generated by rotating a parabola about said common vertical axis with its focal point on the periphery of said heating unit and its axis tilted upwardly at an angle to the horizontal, an electric motor supported on the base and fan blade means driven by the motor for effecting circulation of air inwardly along the surface of the lower reflector, over the heater unit and outwardly along the surface of the upper reflector.

DONALD L. McFARLAND.

REFERENCES CITED

The following references are of record in the file of this patent:

UNITED STATES PATENTS

| Number | Name | Date |
|---|---|---|
| 1,416,964 | Moreton | May 23, 1922 |
| 1,450,589 | Graff et al. | Apr. 3, 1923 |
| 1,547,647 | Furfaro et al. | July 28, 1925 |
| 1,749,039 | Lincecum | Mar. 4, 1930 |
| 1,800,216 | Hill | Apr. 14, 1931 |
| 2,474,594 | Rausch et al. | June 28, 1949 |